United States Patent [19]

Koy et al.

[11] 3,745,620
[45] July 17, 1973

[54] METHOD OF MAKING CORONA-DISCHARGE ELECTRODE STRUCTURES AND ASSEMBLY THEREFORE

[75] Inventors: Hermann Koy, Frankfurt Main; Ivan Keserin, Hochst, both of Germany

[73] Assignee: Metallgesellschaft Aktiengesellschaft, Frankfurt/Main, Germany

[22] Filed: Aug. 31, 1971

[21] Appl. No.: 176,524

[30] Foreign Application Priority Data
Sept. 10, 1970 Germany.................. P 20 44 738.5

[52] U.S. Cl. ................................. 29/25.16, 55/147
[51] Int. Cl. ................................................ H01j 9/36
[58] Field of Search ........................... 55/140, 147; 204/312; 29/452, 25.15, 25.16; 254/29 A

[56] References Cited
UNITED STATES PATENTS

| | | |
|---|---|---|
| 2,362,716 | 11/1944 | Phillips .............................. 55/147 |
| 3,354,617 | 11/1967 | Hoisington et al................... 55/147 |
| 1,919,751 | 7/1933 | Schenk ............................. 254/29 A |
| 2,329,550 | 9/1943 | Mentesana et al................. 254/29 A |

*Primary Examiner*—Charles W. Lanham
*Assistant Examiner*—J. W. Davie
*Attorney*—Karl F. Ross

[57] ABSTRACT

A method of making corona-discharge electrode structures for electrostatic precipitators in which the individual elongated electrodes are inserted in a frame, anchored at one end to the latter by, for example, welding, inserted through a limb of the frame opposite the weld site, tensioning against the frame by insertion of a wedge between a shoulder or abutment of the electrode lying beyond this limb of the frame and the frame, and welding the tensioned electrode to the frame. The assembly of the present invention includes the removable wedge which is received between the shoulder and the frame for retaining the electrode in a tensioned state prior to welding.

7 Claims, 10 Drawing Figures

PATENTED JUL 17 1973 3,745,620
SHEET 1 OF 4
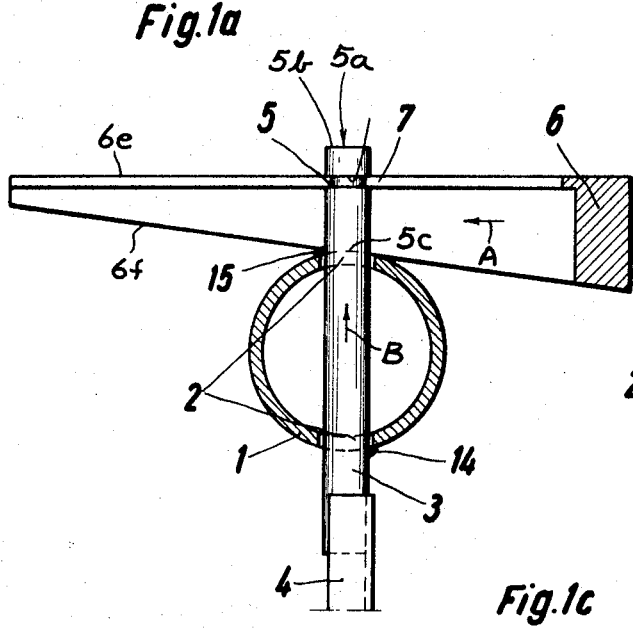
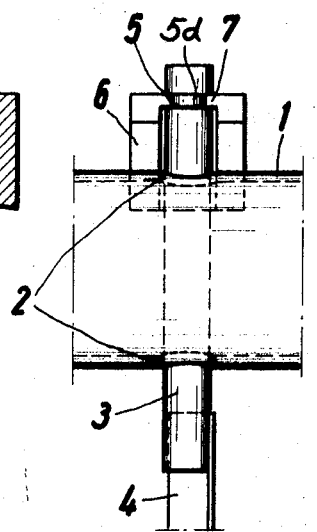
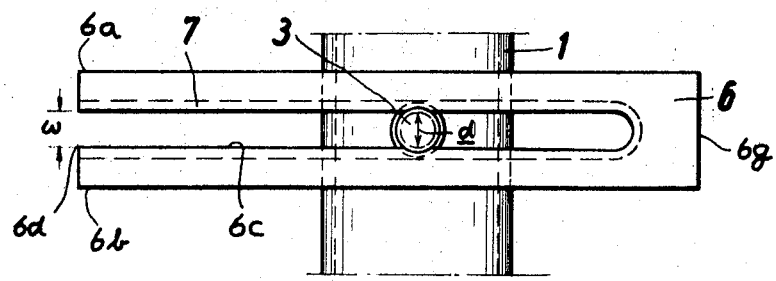
Hermann Koy
Ivan Keserin
*Inventors.*
By
Karl J. Ross
*Attorney*

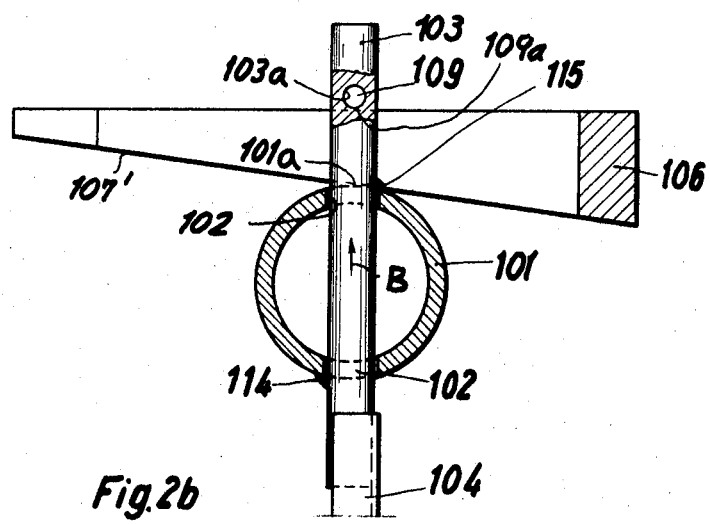
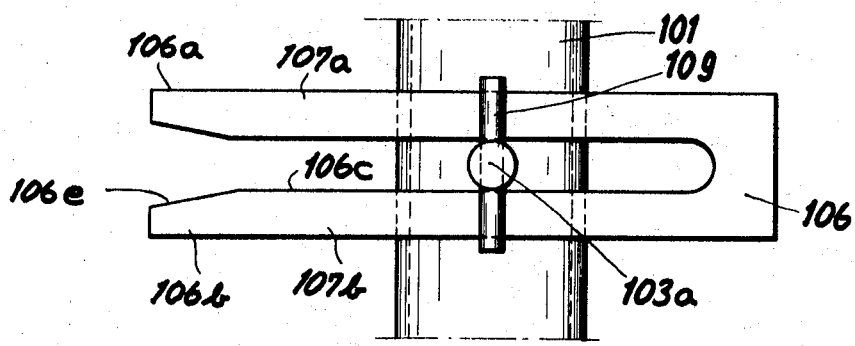

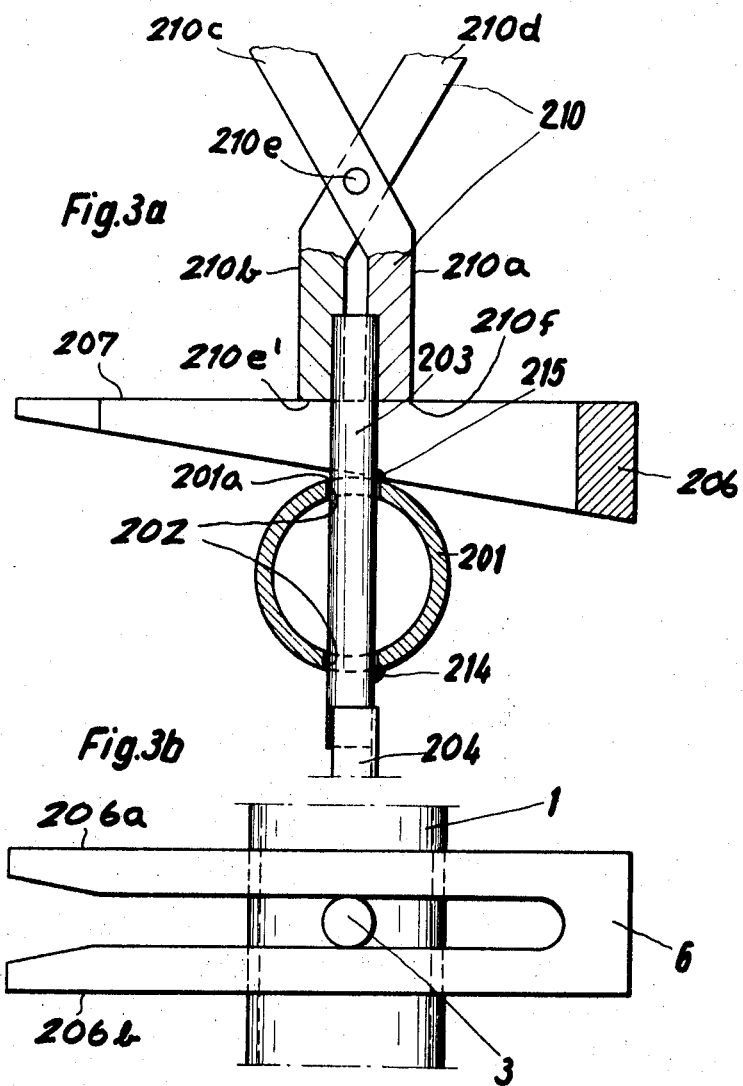

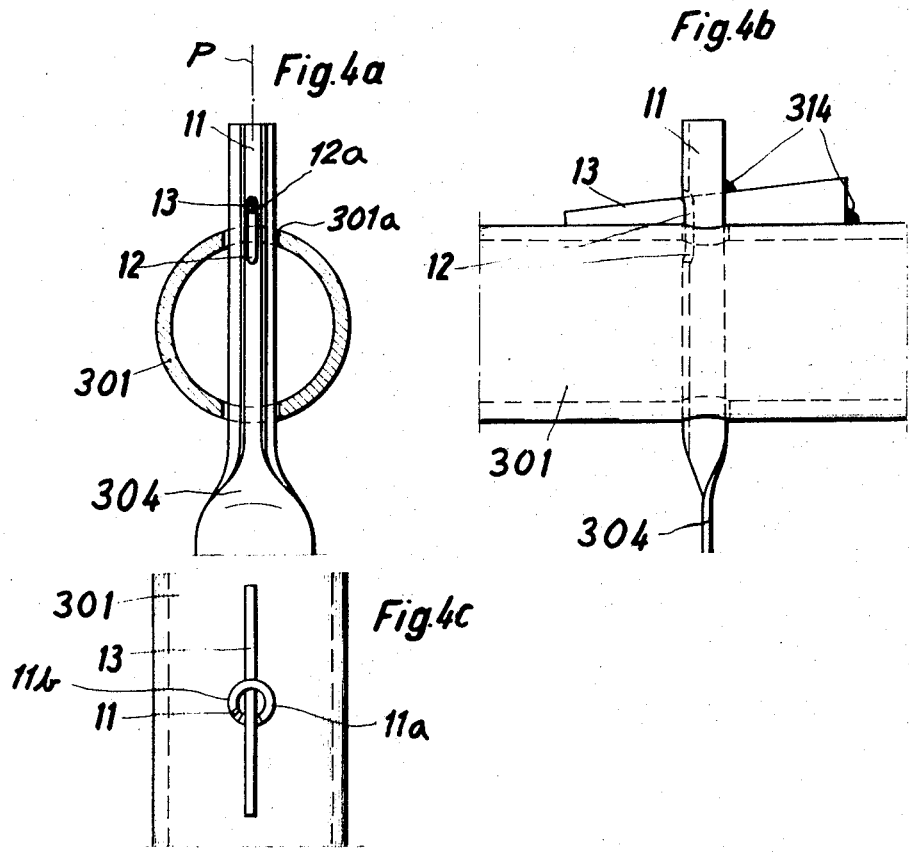

METHOD OF MAKING CORONA-DISCHARGE ELECTRODE STRUCTURES AND ASSEMBLY THEREFORE

FIELD OF THE INVENTION

Our present invention relates to a method of making or assembling corona-discharge electrode structures for electrostatic precipitators and to an assembly for use with this method. More particularly, the invention relates to a method of anchoring corona-discharge electrodes in an electrode frame.

BACKGROUND OF THE INVENTION

In recent years, increasing attention has been given to so-called "electrostatic precipitators" for the separation of particles from a gas stream. Electrostatic precipitators, dust-removal apparatus and solids-collecting apparatus operate on the principle that solid particles entrained in a gas stream can adsorb ions and assume an electric charge. Oppositely charged collector electrodes in the path of the gas stream pick up the charged particles with the aid of electrostatic forces.

In general, an electrostatic dust separator or precipitator comprises a housing provided with one or more planar arrays of corona-discharge electrodes traversed by the particle-carrying gas stream and adapted to produce the ions whose adsorption by the particles provides the necessary charge to the solids. Downstream of the corona-discharge electrodes or otherwise positioned so as to be swept by the charged particle-containing gas stream or arrays of dust-collector electrodes upon which the particles accumulate and designed to be rapped by a device designed to cause the dust-collector electrodes to shed the dust layers into a dust-collecting bin disposed below the precipitation chamber. The apparatus may also include means for inducing the flow of particle-containing gas through the housing and means for administering a dust-shedding blow to the electrodes when desirable.

The corona-discharge electrodes of conventional systems generally comprise a frame, which may be removably positioned in the housing, or can be fixed therein, and a plurality of transversely spaced mutually parallel electrodes tensioned in this frame. The electrodes may be rods, wires or strips.

It is imperative in corona-discharge units of the character described that the electrodes be neither too loose nor too tight. For example, if an electrode is too loose, it may be deflected by the gas stream or other forces and its distance from surrounding parts may vary. Any such variance will result in preferential electrical discharge and a reduction of the efficiency of the apparatus and/or concentration of high-temperature discharge energy at a site susceptible to burnthrough or breakdown, or cause short-circuiting of the system. On the other hand, excessive tension in any or all of the electrodes may result in breakage. Furthermore, it is disadvantageous to tension the electrode elements of a particular frame to different extents, since thermal contraction or extension and similar stresses, including vibrational stresses resulting from operation of the rapping device, may result in breakage of excessively tensioned elements or loosening of under-tightened elements.

It should be noted, moreover, that the corona-discharge electrodes and their frames must have a minimum rigidity sufficient to sustain vibrational and intermittent impact which may be delivered thereto to cause the shedding of any particles or dust which may accumulate thereon. Hence, the electrode assembly must be designed to be relatively thin (so that large numbers of corona-discharge units may be accommodated in a small space), the individual electrodes must be relatively thin to provide a high surface area/volume ratio, the support frame and electrode elements must form a rigid assembly to permit vibration or rapping in the elimination of dust, the individual electrode elements must be uniformly tensioned in the frame to obviate the disadvantages discussed earlier, the method of assembly must be simple and of low cost since several thousand electrode elements may be provided in a single electrostatic precipitator, and the anchoring of the individual elements must be such as to prevent loosening or breakage with use.

In order to approach this ideal construction, it has been proposed to provide the frame of tubes which may be welded together, the electrodes spanning a pair of parallel limbs of the frames and extending generally perpendicular thereto, but parallel to the other limbs of the frame. In systems in which the electrode elements are provided as wires, rods or the like, it has been suggested to form them with openings and to drive wedges into these openings, thereby achoring the electrode elements to the limbs under tension determined by the extent to which the wedge is inserted. The samll end of the wedge may then be bent over to prevent withdrawal.

While this system provides a means for both anchoring and tensioning the electrode elements, it is not always entirely satisfactory in that the wedges may loosen with time, in that the insertion of the wedge may damage the electrodes by kinking them and permitting breakage during rapping when dust-shedding is required, and in that highly skilled labor is required.

It has also been proposed to obtain uniform tensioning systems in which the electrode wires are soldered to the frame limbs and the tension control led by spreading the latter; these systems have also proved to be unsatisfactory because loose corona-discharge electrodes often appear among tensioned electrodes and breakage is not uncommon as a result of vibration. Efforts to use sheet-metal strips as electrodes have proved to be unsatisfactory even where the strips have been provided with threaded rods at their ends. In these systems, a nut tensions the electrode in the frame but has the danger of loosening. It should also be observed that, where the means for anchoring the electrode in the frame is complex, the problem is multiplied by the fact that several thousand electrode elements may be provided in a given electrostatic precipitator. Hence, both the cost of the anchoring parts and the time required for tensioning for each electrode element is multiplied by several thousand in the assembly of the electrostatic precipitator.

OBJECTS OF THE INVENTION

It is the principal object of the present invention to provide an improved low-cost method of anchoring corona-discharge electrode elements in a frame whereby the disadvantages of earlier systems may be obviated.

It is another object of the invention to provide an improved method of anchoring an electrode element in a support frame in which a saving in time and cost can be obtained, whereby a controlled tension can be generated without requiring skilled labor, wherein the anchoring assembly is as simple as possible, wherein the assembly can withstand the shocks of rapping devices, and wherein the danger of breakage is reduced.

SUMMARY OF THE INVENTION

These objects and others which will become apparent hereinafter are attained, in accordance with the present invention, by a system for anchoring the electrode elements to a pair of mutually parallel, spaced-apart limbs of a tubular electrode frame by securing one end of each electrode element to the respective limb, e.g. by direct welding, thereafter driving a wedge between the opposite limb and a shoulder formed on the electrode to tension the electrode element, welding this tensioned and shoulder-carrying end of the electrode to the other limb, and removing the wedge and, if desired, the shoulder-forming structure.

Since the electrode is welded at each end to the respective limbs of the tubular frame, there is no danger of slippage, nor is there any need for complex anchoring devices. The process is, of course, repeated to weld all of the electrodes to the limbs of the frame and, where the wedges are provided in an array, numerous electrode elements may be tensioned simultaneously. In other words, the objects of the invention are achieved by anchoring one end of the corona-discharge electrode to one side of the frame, tensioning the other end of the corona-discharge electrode against the opposite side of the frame, welding this other end of the electrode against the other side of the frame and withdrawing the means for tensioning the electrode. Of course, the welding step is carried out while the wedge is in place to maintain the tension.

Among the advantages of the present invention is that the corona-discharge electrode wires, rods or strips can be uniformly tensioned against the frame and can maintain this tension throughout their useful life, there being no danger of loosening. Surprisingly, this method of producing electrode assemblies has been found to represent a remarkable advance over the art in terms of the time required for producing the assembly. For example, it has been found that a saving of 50 percent in the time required to mount the electrode elements in an electrode frame can be gained by using the present method in place of systems in which the individual electrodes are anchored and tensioned by nut-and-spindle or threaded-rod arrangements. This saving in time and labor cost is especially significant where, as is generally the case, several thousand electrode elements must be mounted and tensioned for a given electrostatic precipitator. Also it should be noted that the removal of the tensioning means eliminates conductive or metallic parts whose presence under conditions of vibration of the type generally encountered in electrostatic precipitators only increase the possibility of short-circuiting or interference with dust collection. The entire frame can be assembled in the factory with ease and no tension adjustment is required at the site at which the electrostatic precipitator is erected.

According to another feature of this invention, the shoulder juxtaposed with the limb of the frame and against which the wedge bears, is removably mounted upon the electrode element. Where a permanent shoulder is provided, however, we have found it to be advantageously constituted as an annular shoulder, preferably forming a flank of an annular groove in a rod or the like attached to the electrode element. The latter may then be a strip or wire or may have any other desirable configuration. In this case, the wedge may include a channel receiving the root or neck of the groove and having flanks which are received within the groove. Alternatively, the shoulder may be formed by a pin traversing the rod-like portion of the electrode element projecting beyond the limb of the frame. In this case, as in the case previously described, the wedge may be bifurcated and have a pair of legs of tapered profile which are receivable on opposite sides of the electrode axis between the shoulder and an outer surface of the frame limb. In yet another embodiment of the invention, the shoulder is formed by a removable clamp engageable with the end of the electrode element traversing the limb of the frame. In all of these structures, we prefer to drive the wedge transversely to the limb of the frame and to the electrode.

According to yet another aspect of the invention, the shoulder is formed as a slot in the electrode, preferably in a portion thereof integral or unitarily with the main electrode portion and traversing the frame while the wedge is inserted parallel to the limb.

In all of the embodiments illustrated, we weld the electrode directly or indirectly to the frame and preferably remove the wedge after it has been embodied. In some cases, however, especially where the wedge is driven directly through the electrode, we may choose to permit the wedge to remain in the assembly and then prefer to weld it in place. Two weld tacks or beads are employed at the tensioned end of the electrode element and may be positioned as is convenient for welding purposes. For example, one such tack may be provided between the underside of the frame limb and one side of the electrode while the other tack is provided between the upper portion of the limb and the opposite side of the electrode. Another alternative provides both tacks on one side of the electrode or one tack between the electrode and the wedge and another tack between the wedge and the frame.

While we have mentioned that we prefer to weld the other end of the electrode (the end opposite that which is provided with the shoulder) to the corresponding limb of the frame because of the higher speed of fixing the electrode elements according to the present invention, any other anchoring system may be used instead.

DESCRIPTION OF THE DRAWING

The above and other objects, features and advantages of the present invention will become more readily apparent from the following description, reference being made to the accompanying drawing, in which:

FIGS. 1a, 1b and 1c are respectively side, cross-sectional, front and top views of the anchoring assembly of one electrode element in an electrode frame for an electrostatic precipitator according to the present invention;

FIGS. 2a and 2b are respectively a lateral cross-section (partly broken away) and a plan view of an embodiment illustrating another aspect of the invention;

FIGS. 3a and 3b are respectively a side cross-sectional view (partly in elevation) and a plan view with the clamping device removed illustrative of another embodiment of the invention; and FIGS. 4a, 4b and 4c are respectively a side cross-sectional view, a front elevational view and a plan view of yet another embodiment of the invention.

SPECIFIC DESCRIPTION

In FIGS. 1a, 1b and 1c, we show the upper limb 1 of a tubular support frame which is of rectangular configuration and has its horizontal upper and lower limb spanned by the electrode 4. At the lower limb, the electrodes 4, here shown to be metal strips bent around the rod 3 and of L-cross-section, are simply welded to the tubular frame member.

At the lower end, the corona-discharge electrode 4 is formed with the rod 3 which is fitted through bores 2 vertically aligned in the tubular frame limb 1 so that an extremity 5a projects beyond the frame limb 1. This extremity is formed with an annular circumferential groove 5 and a reduced diameter head 5b defining a downwardly turned annular shoulder 5c juxtaposed with the upper surface 1a of the upper frame limb. A bifurcated clamp-like wedge 6 can be driven between the shoulder 5c and the surface 1a as best seen in FIG. 1a. To this end, the wedge 6 is provided with a pair of legs 6a and 6b each of which is of angle cross-section and has an inwardly turned ledge 7 defining the respective inner edge of a slot 6c open at 6d to receive the root 5d of the groove. In other words, the width w of the gap 6c between the ledges 7 is approximately equal to or only slightly greater than the diameter d of the neck formed by the groove.

While the upper surface 6e of each of the legs 6a, 6b lies in a plane parallel to the plane of frame limb 1 and is horizontal when the frame is vertical, the underside 6f of the wedge tapers from a narrow extremity at the mouth 6d to a wide extremity at a web 6g joining the legs. Thus, as the wedge is urged in the direction of arrow A into the gap between the surfaces 5c and 1a, the rod 3 is drawn upwardly (arrow B) to tension the electrode 4. When the tensioning is complete, the rod 3 may be welded at 14 and 15 to the frame limb 1, these welds being on diametrically opposite sides of the electrode as well as on diametrically opposite sides of the frame limb. A'ternatively, a weld may be provided between the head 5b and the wedge 6, between the wedge 6 and the frame limb 1 and/or between the frame limb and the rod 3. When a weld is provided between the wedge and the rod, we prefer not to withdraw the wedge. It is preferable, however, simply to remove the wedge and reuse the same.

In the embodiment illustrated in FIG. 2a and 2b, the upper frame limb 101 is again provided with vertically aligned, diametrically opposite bores 102 traversed by a metal rod 103 which projects beyond the upper surface 101a of the upper frame limb. While the embodiment of FIGS. 1a through 1c provided the shoulder aginst which the edge worked as a flank of a circumferential groove, the rod is here formed with a bore 103a which receives a pin 109 running parallel to the axis of the frame limb 101 and having an underside 109a juxtaposed with the surface 101a of the frame limb. In this embodiment, the tensioning wedge 106 has a pair of legs 106a, 106b which engage the underside 109a forming the shoulder. The lower surface 107' of each leg rests against the frame limb 101. When the wedge is driven between the pin 109 and the frame limb, therefore, the rod 103 is urged upwardly as represented by arrow B to tension the electrode 104 whose lower end has been anchored to the opposite but parallel limb of the frame. In this embodiment, a weld tack 114 can be provided between the tubular member 101 and the rod 105 at the left-hand side of the latter and at the bottom of the tubular member 101. A second, diametrically opposite tack weld 115 is provided between the right-hand side of rod 103 and the upper surface of tubular member 101. In this case, both the pin 109 and the wedge 106 can be removed. The slot 106c defined between the legs 106a and 106b has an outwardly flared mouth 106e to enable the legs of the bifurcated wedge 106 to guide the pin between them. In the event, it is desired to permit the wedge to remain, a weld tack may be provided between the rod 103 and the wedge 106, between the pin 109 and the wedge 106, or between the wedge 106 and the frame limb 101.

FIGS. 3a and 3b illustrate still another embodiment of the present invention which is generally similar to FIGS. 2a and 2b except that the pin 109 is replaced by spring-clamp tongs 210. In this embodiment, the rod 203 at the upper end of corona-discharge electrode 204 passes through the aligned bores 202 in the frame limb 201 and is engaged by the clamp 210. The jaws 210a and 210b of the latter are biased toward one another by a suitable spring of the tongs (not shown) which urge apart the arms 210c and 210e attached to the jaws 210a and 210b pivotally connected at a fulcrum 210e. The jaws 210a and 210b may be toothed to prevent slippage, or may have a well-defined slippage with respect to the rod so that the desired tension level is obtained by driving a wedge between the tongs and the frame limb until slippage of the former occurs. At this point, welding is carried out. The tongs 210 form a pair of shoulders 210e and 210f juxtaposed with the surface 201a of the upper frame limb and resting against the surfaces 207 of a wedge 206 whose legs 206a and 206b straddle the rod 203 in the manner previously described. After the wedge is inserted as already discussed, the rod 203 may be welded at 214 and 215 along the right-hand side of the rod and at opposite sides of the frame limb 201. When it is desired to leave the wedge in place, we may wedge the latter to the rod 203 or to the frame limb 201 as previously described. In almost every case, it has been found to be advantageous to remove the tongs for reuse.

In FIGS. 4a to 4c, we have shown a corona-discharge electrode 304 of sheet-metal strip which is bent into a U-configuration at 11 and is provided with a longitudinal slot 12 by stamping or punching. The slot 12 projects beyond the upper surface 301a of the upper frame limb 301 and lies in the vertical median plane P of the frame, perpendicular to the axis of the frame limb 301. The upper end 12a of the slot forms a shoulder spaced from the surface 301a. In this case, a simple wedge 13 can be driven between the surface 12a and the surface 101a to lie parallel to the axis of the frame limb 301 in the plane P. Lateral movement of the wedge is prevented by the arms 11a and 11b of the U. In this embodiment, we avoid the need for any rod affixed to the sheet metal corona-discharge electrode. The weld tacks 314 may be applied between the wedge and the U-section end of the corona-discharge electrode strip 4 and between the wedge 13 and the frame limb 301. Here the wedge remains in place although it is possible to remove this wedge if tack welds are provided directly between the upper limb of the frame and the U-section end 11 of the corona-discharge electrode. Experiments have shown that loosening of the electrodes does not occur in any of the embodiments described during use. The entire electrode frame can be mounted in the electrostatic precipitator without difficulty.

We claim:

1. A method of making a corona-discharge electrode assembly for an electrostatic precipitator, said method comprising the steps of anchoring each of a plurality of elongated electrode elements to one side of a tubular metal frame whereby said electrode elements span said frame and emerge at a limb member at the opposite side thereof; forming a shulder member on each electrode element confronting said limb member; in-serting a wedge member between each said shoulder member and said limb member to tension each of said elements; and welding said limb member to each said electrode element to secure said electrode elements in a tensioned condition within said frame.

2. The method defined in claim 1 wherein each of said shoulder members is formed unitarily upon an extension of the respective electrode element.

3. The method defined in claim 2 wherein said extension is provided with a slot having a wall forming the respective shoulder member and said wedge member is inserted in said slot.

4. The method defined in claim 3 wherein each said wedge member is welded to the respective extension and to said limb member.

5. The method defined in claim 1 wherein each said shoulder member is a shoulder formed unitarily on the respective electrode element and is juxtaposed with said limb member, the respective wedge member being received between said limb member and said shoulder.

6. The method defined in claim 5 wherein said electrode element is welded to said limb member, said method further comprising the step of withdrawing said wedge member upon welding the electrode element to said limb member.

7. The method defined in claim 1 wherein said shoulder member is a shoulder removably mounted upon each said electrode element, said electrode element welded to said limb member, said method further comprising the step of withdrawing the respective wedge member and shoulder upon welding of the electrode element to said limb member.

* * * * *